US008082531B2

(12) United States Patent
Ogami et al.

(10) Patent No.: US 8,082,531 B2
(45) Date of Patent: Dec. 20, 2011

(54) METHOD AND AN APPARATUS TO DESIGN A PROCESSING SYSTEM USING A GRAPHICAL USER INTERFACE

(75) Inventors: Kenneth Ogami, Bothell, WA (US); Douglas Anderson, Edmonds, WA (US); Jon Pearson, Mukilteo, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 382 days.

(21) Appl. No.: 11/201,627

(22) Filed: Aug. 10, 2005

(65) Prior Publication Data
US 2006/0036973 A1    Feb. 16, 2006

Related U.S. Application Data

(60) Provisional application No. 60/601,303, filed on Aug. 13, 2004.

(51) Int. Cl.
*G06F 17/50* (2006.01)
(52) U.S. Cl. .................. 716/117; 716/102; 716/104
(58) Field of Classification Search ............. 716/16, 716/30–139; 713/1, 100; 717/106, 110, 717/136
See application file for complete search history.

(56) References Cited

U.S. PATENT DOCUMENTS

| | | | |
|---|---|---|---|
| 4,061,987 A | 12/1977 | Nagahama | |
| 4,134,073 A | 1/1979 | MacGregor | |
| 4,138,671 A | 2/1979 | Comer et al. | |
| 4,272,760 A | 6/1981 | Prazak et al. | |
| 4,344,067 A | 8/1982 | Lee | |
| 4,689,740 A | 8/1987 | Moelands et al. | |
| 4,692,718 A | 9/1987 | Roza et al. | |
| 4,827,401 A | 5/1989 | Hrustich et al. | |
| 4,868,525 A | 9/1989 | Dias | |
| 4,947,169 A | 8/1990 | Smith et al. | |
| 5,050,168 A | 9/1991 | Paterson | |
| 5,140,197 A | 8/1992 | Grider | |
| 5,150,079 A | 9/1992 | Williams et al. | |
| 5,155,836 A | 10/1992 | Jordan et al. | |
| 5,175,884 A | 12/1992 | Suarez | |
| 5,200,751 A | 4/1993 | Smith | |
| 5,202,687 A | 4/1993 | Distinti | |

(Continued)

FOREIGN PATENT DOCUMENTS
AL   PCT/US96/17305 A1   6/1996

(Continued)

OTHER PUBLICATIONS

R.Nouta, H.J. Lincklaen Arriëns, Design and FPGA-implementation of wave digital bandpass filters with arbitrary amplitude transfer characteristics. Proceedings of ProRISC 2003, pp. 127-2131 (2003).*

(Continued)

*Primary Examiner* — Vuthe Siek
*Assistant Examiner* — Aric Lin

(57) ABSTRACT

A method and an apparatus to design a processing system using a graphical user interface (GUI) are described. The method includes allowing a user to define a transfer function via a GUI. The method may further include submitting the transfer function to a processing device maker associated with a processing device. The processing device maker may generate processing device code without intervention by the user. Furthermore, the processing device may execute the processing device code to perform the transfer function defined.

20 Claims, 10 Drawing Sheets

U.S. PATENT DOCUMENTS

| | | | |
|---|---|---|---|
| 5,258,760 A | 11/1993 | Moody et al. | |
| 5,304,955 A | 4/1994 | Atriss et al. | |
| 5,319,370 A | 6/1994 | Signore et al. | |
| 5,331,571 A | 7/1994 | Aronoff et al. | |
| 5,345,195 A | 9/1994 | Cordoba et al. | |
| 5,371,860 A | 12/1994 | Mura et al. | |
| 5,399,922 A | 3/1995 | Kiani et al. | |
| 5,414,308 A | 5/1995 | Lee et al. | |
| 5,426,378 A | 6/1995 | Ong | |
| 5,428,319 A | 6/1995 | Marvin et al. | |
| 5,430,687 A | 7/1995 | Hung et al. | |
| 5,438,672 A | 8/1995 | Dey | |
| 5,440,305 A | 8/1995 | Signore et al. | |
| 5,479,643 A | 12/1995 | Bhaskar et al. | |
| 5,546,433 A | 8/1996 | Tran et al. | |
| 5,552,748 A | 9/1996 | O'Shaughnessy | |
| 5,557,762 A | 9/1996 | Okuaki et al. | |
| 5,559,502 A | 9/1996 | Schutte | |
| 5,563,526 A | 10/1996 | Hastings et al. | |
| 5,574,892 A | 11/1996 | Christensen | |
| 5,590,354 A | 12/1996 | Klapproth et al. | |
| 5,594,734 A | 1/1997 | Worsley et al. | |
| 5,600,262 A | 2/1997 | Kolze | |
| 5,604,466 A | 2/1997 | Dreps et al. | |
| 5,614,861 A | 3/1997 | Harada | |
| 5,630,102 A | 5/1997 | Johnson et al. | |
| 5,633,766 A | 5/1997 | Hase et al. | |
| 5,670,915 A | 9/1997 | Cooper et al. | |
| 5,680,070 A | 10/1997 | Anderson et al. | |
| 5,684,434 A | 11/1997 | Mann et al. | |
| 5,689,196 A | 11/1997 | Schutte | |
| 5,699,024 A | 12/1997 | Manlove et al. | |
| 5,703,871 A | 12/1997 | Pope et al. | |
| 5,710,906 A | 1/1998 | Ghosh et al. | |
| 5,745,011 A | 4/1998 | Scott | |
| 5,760,611 A * | 6/1998 | Gould | 326/113 |
| 5,781,747 A | 7/1998 | Smith et al. | |
| 5,828,693 A | 10/1998 | Mays et al. | |
| 5,870,004 A | 2/1999 | Lu | |
| 5,870,345 A | 2/1999 | Stecker | |
| 5,872,464 A | 2/1999 | Gradinariu | |
| 5,880,598 A | 3/1999 | Duong | |
| 5,889,936 A | 3/1999 | Chan | |
| 5,898,345 A | 4/1999 | Namura et al. | |
| 5,903,718 A | 5/1999 | Marik | |
| 5,939,949 A | 8/1999 | Olgaard et al. | |
| 5,968,135 A | 10/1999 | Teramoto et al. | |
| 5,982,229 A | 11/1999 | Wong et al. | |
| 6,018,559 A | 1/2000 | Azegami et al. | |
| 6,107,769 A * | 8/2000 | Saylor et al. | 318/600 |
| 6,140,853 A | 10/2000 | Lo | |
| 6,144,327 A | 11/2000 | Distinti et al. | |
| 6,157,270 A | 12/2000 | Tso | |
| 6,166,367 A | 12/2000 | Cho | |
| 6,188,975 B1 | 2/2001 | Gay | |
| 6,191,660 B1 | 2/2001 | Mar et al. | |
| 6,202,044 B1 | 3/2001 | Tzori | |
| 6,211,741 B1 | 4/2001 | Dalmia | |
| 6,225,866 B1 | 5/2001 | Kubota et al. | |
| 6,249,167 B1 | 6/2001 | Oguchi et al. | |
| 6,263,302 B1 | 7/2001 | Hellestrand et al. | |
| 6,272,646 B1 | 8/2001 | Rangasayee | |
| 6,294,962 B1 | 9/2001 | Mar | |
| 6,304,101 B1 | 10/2001 | Nishihara | |
| 6,314,530 B1 | 11/2001 | Mann | |
| 6,321,369 B1 | 11/2001 | Heile et al. | |
| 6,332,201 B1 | 12/2001 | Chin et al. | |
| 6,338,109 B1 | 1/2002 | Snyder et al. | |
| 6,356,862 B2 | 3/2002 | Bailey | |
| 6,369,660 B1 | 4/2002 | Wei | |
| 6,377,646 B1 | 4/2002 | Sha | |
| 6,377,908 B1 * | 4/2002 | Ostrowski et al. | 703/2 |
| 6,434,187 B1 | 8/2002 | Beard | |
| 6,445,211 B1 | 9/2002 | Saripella | |
| 6,460,172 B1 | 10/2002 | Insenser Farre et al. | |
| 6,507,214 B1 | 1/2003 | Snyder | |
| 6,525,593 B1 | 2/2003 | Mar | |
| 6,535,946 B1 | 3/2003 | Bryant et al. | |
| 6,542,025 B1 | 4/2003 | Kutz et al. | |
| 6,553,057 B1 | 4/2003 | Sha | |
| 6,560,306 B1 | 5/2003 | Duffy | |
| 6,563,391 B1 | 5/2003 | Mar | |
| 6,567,426 B1 | 5/2003 | van Hook et al. | |
| 6,575,373 B1 | 6/2003 | Nakano | |
| 6,598,178 B1 | 7/2003 | Yee et al. | |
| 6,601,236 B1 | 7/2003 | Curtis | |
| 6,603,330 B1 | 8/2003 | Snyder | |
| 6,604,179 B2 | 8/2003 | Volk et al. | |
| 6,608,472 B1 | 8/2003 | Kutz et al. | |
| 6,611,220 B1 | 8/2003 | Snyder | |
| 6,611,276 B1 | 8/2003 | Muratori et al. | |
| 6,614,320 B1 | 9/2003 | Sullam et al. | |
| 6,637,015 B1 | 10/2003 | Ogami et al. | |
| 6,664,978 B1 | 12/2003 | Kekic et al. | |
| 6,667,642 B1 | 12/2003 | Moyal | |
| 6,681,280 B1 | 1/2004 | Miyake et al. | |
| 6,691,301 B2 | 2/2004 | Bowen | |
| 6,701,487 B1 | 3/2004 | Ogami et al. | |
| 6,701,508 B1 | 3/2004 | Bartz et al. | |
| 6,718,533 B1 | 4/2004 | Schneider et al. | |
| 6,765,407 B1 | 7/2004 | Snyder | |
| 6,771,552 B2 | 8/2004 | Fujisawa | |
| 6,784,821 B1 | 8/2004 | Lee | |
| 6,785,881 B1 | 8/2004 | Bartz et al. | |
| 6,798,299 B1 | 9/2004 | Mar et al. | |
| 6,823,282 B1 | 11/2004 | Snyder | |
| 6,823,497 B2 | 11/2004 | Schubert et al. | |
| 6,825,689 B1 | 11/2004 | Snyder | |
| 6,854,067 B1 | 2/2005 | Kutz et al. | |
| 6,859,884 B1 | 2/2005 | Sullam | |
| 6,865,429 B1 | 3/2005 | Schneider et al. | |
| 6,868,500 B1 | 3/2005 | Kutz et al. | |
| 6,892,310 B1 | 5/2005 | Kutz et al. | |
| 6,892,322 B1 | 5/2005 | Snyder | |
| 6,898,703 B1 | 5/2005 | Ogami et al. | |
| 6,901,563 B1 | 5/2005 | Ogami et al. | |
| 6,910,126 B1 | 6/2005 | Mar et al. | |
| 6,950,954 B1 | 9/2005 | Sullam et al. | |
| 6,952,778 B1 | 10/2005 | Snyder | |
| 6,957,242 B1 | 10/2005 | Snyder | |
| 6,967,511 B1 | 11/2005 | Sullam | |
| 6,981,090 B1 | 12/2005 | Kutz et al. | |
| 6,996,799 B1 | 2/2006 | Cismas et al. | |
| 7,005,933 B1 | 2/2006 | Shutt | |
| 7,023,257 B1 | 4/2006 | Sullam | |
| 7,024,636 B2 | 4/2006 | Weed | |
| 7,055,035 B2 * | 5/2006 | Allison et al. | 713/176 |
| 7,058,921 B1 | 6/2006 | Hwang et al. | |
| 7,073,158 B2 | 7/2006 | McCubbrey | |
| 7,086,014 B1 | 8/2006 | Bartz et al. | |
| 7,092,980 B1 | 8/2006 | Mar et al. | |
| 7,103,108 B1 | 9/2006 | Beard | |
| 7,127,630 B1 | 10/2006 | Snyder | |
| 7,149,316 B1 | 12/2006 | Kutz et al. | |
| 7,150,002 B1 | 12/2006 | Anderson et al. | |
| 7,180,342 B1 | 2/2007 | Shutt et al. | |
| 7,185,162 B1 | 2/2007 | Snyder | |
| 7,185,321 B1 | 2/2007 | Roe et al. | |
| 7,221,187 B1 | 5/2007 | Snyder et al. | |
| 7,283,151 B2 | 10/2007 | Nihei et al. | |
| 7,386,740 B2 | 6/2008 | Kutz et al. | |
| 7,406,674 B1 | 7/2008 | Ogami et al. | |
| 2002/0121679 A1 | 9/2002 | Bazarjani et al. | |
| 2002/0156998 A1 | 10/2002 | Casselman | |
| 2003/0028772 A1 | 2/2003 | Allison et al. | |
| 2004/0054821 A1 | 3/2004 | Warren et al. | |
| 2004/0060032 A1 | 3/2004 | McCubbrey et al. | |
| 2004/0098689 A1 | 5/2004 | Weed | |
| 2004/0221238 A1 * | 11/2004 | Cifra et al. | 715/762 |

FOREIGN PATENT DOCUMENTS

| | | |
|---|---|---|
| EP | 0308583A2 A1 | 3/1989 |
| EP | 368398 A1 | 5/1990 |
| EP | 0450863A2 A1 | 10/1991 |
| EP | 0499383A2 A1 | 8/1992 |
| EP | 0639816A2 A1 | 2/1995 |
| EP | 1170671A1 A1 | 1/2002 |

| | | | |
|---|---|---|---|
| EP | 1205848 A1 | 5/2002 | |
| EP | 1191423A2 A1 | 2/2003 | |
| JP | 404083405 A1 | 3/1992 | |
| JP | 405055842 A1 | 3/1993 | |
| JP | 06021732 A1 | 1/1994 | |
| JP | 404095408 A1 | 3/2002 | |
| WO | 9532478 A1 | 11/1995 | |
| WO | PCT/US98/34376 A1 | 8/1998 | |
| WO | PCT/US99/09712 A1 | 2/1999 | |

OTHER PUBLICATIONS

M.D. Lutovac, D.V. Tosic, Symbolic Computation of Digital Filter Transfer Function using MATLAB, Proceedings of 23rd International Conference on Microelectronics, pp. 651-654 (2002).*

R.P. Burgos et al., Power converter analysis and design using Matlab: a transfer function approach, Proceedings of IEEE International Symposium on Industrial Electronics 1998, vol. 2, pp. 552-557 (1998).*

Virtex II Pro Platform FPGA Developer's Kit, Jan. 2003 Release, by Xilinx Inc., pp. 118-119.*

Efstathiou, "Analog Electronics: Basic Circuits of Operational Amplifiers", http://web.archive.org/web/20021231045232/http://www.chem.uoa.gr/Applets/AppletOpAmps/Appl_OpAmps2.html (Dec. 31, 2002 version, retrieved from the Internet Archives).*

PCT International Search Report, PCT/US05/28898, filed Aug. 12, 2005, mailed Mar. 6, 2007.

PCT Preliminary Report on Patentability (Chapter I of the Patent Cooperation Treaty), PCT/US2005/028793, filed Aug. 12, 2005, mailed Dec. 21, 2007.

PCT Preliminary Report on Patentability (Chapter I of the Patent Cooperation Treaty), PCT/US2005/028898, filed Aug. 12, 2005, mailed Apr. 5, 2007.

PCT Written Opinion of the International Searching Authority, PCT/US05/28898, filed Aug. 12, 2005, mailed Mar. 6, 2007.

PCT Written Opinion of the International Searching Authority, PCT/US2005/028793, filed Aug. 12, 2005, mailed Nov. 19, 2007.

PCT International Search Report, PCT/US05/28793, filed Aug. 12, 2005, mailed Nov. 19, 2007.

Office Action Dated Oct. 15, 2007, U.S. Appl. No. 11/201,922, filed Aug. 10, 2005. 12 pages.

Xilinx, "Virtex-II Pro™ Platform FPGA Developer's Kit", Chapter 2: Using Data2BRAM. Jan. 2003 Release. pp. 118-119.

Burgos et al. "Power Converter Analysis and Design Using Matlab: A Transfer Function Approach". Dept. of Electrical Engineering. 0-7803-4756-0/98. 1998 IEEE. p. 552-557.

Lutovac et al. "Symbolic Computation of Digital Filter Transfer Function Using MATLAB". Proc. 23rd International Conference on Microelectronics. pp. 651-654. May 2002.

R. Nouta et al., "Design and FPGA-Implementation of Wave Digital Bandpass Filters with Arbitrary Amplitude Transfer Characteristics", Proceedings of ProRISC 2003, pp. 127-131.

PCT International Search Report for PCT/US05/28791, filing date Aug. 12, 2005, mailing date Mar. 31, 2008 (4 pages).

PCT International Written Opinion for PCT/US05/28791, filing date Aug. 12, 2005, mailing date Mar. 31, 2008 (8 pages).

USPTO Notice of Allowance for U.S. Appl. No. 10/238,966 dated Jan. 27, 2009; 4 pages.

USPTO Non-Final Rejection for U.S. Appl. No. 10/238,966 dated Jun. 30, 2008; 12 pages.

USPTO Non-Final Rejection for U.S. Appl. No. 10/238,966 dated Dec. 26, 2007; 12 pages.

USPTO Final Rejection for U.S. Appl. No. 10/238,966 dated Sep. 27, 2007; 9 pages.

USPTO Non-Final Rejection for U.S. Appl. No. 10/238,966 dated Apr. 19, 2007; 7 pages.

USPTO Non-Final Rejection for U.S. Appl. No. 10/238,966 dated Oct. 20, 2006; 8 pages.

USPTO Non-Final Rejection for U.S. Appl. No. 10/238,966 dated Apr. 6, 2006; 8 pages.

USPTO Notice of Allowance for U.S. Appl. No. 10/033,027 dated Mar. 31, 2009; 7 pages.

USPTO Non-Final Rejection for U.S. Appl. No. 10/033,027 dated Dec. 18, 2008; 5 pages.

USPTO Final Rejection for U.S. Appl. No. 10/033,027 dated Jun. 8, 2007; 8 pages.

USPTO Non-Final Rejection for U.S. Appl. No. 10/033,027 dated Dec. 21, 2006; 31 pages.

USPTO Final Rejection for U.S. Appl. No. 10/033,027 dated Aug. 9, 2006; 6 pages.

USPTO Non-Final Rejection for U.S. Appl. No. 10/033,027 dated Apr. 26, 2006; 26 pages.

USPTO Final Rejection for U.S. Appl. No. 10/033,027 dated Oct. 31, 2005; 24 pages.

USPTO Non-Final Rejection for U.S. Appl. No. 10/033,027 dated Apr. 20, 2005; 20 pages.

USPTO Non-Final Rejection for U.S. Appl. No. 10/033,027 dated Oct. 18, 2004; 17 pages.

USPTO Non-Final Rejection for U.S. Appl. No. 10/001,478 dated Oct. 20, 2008; 18 pages.

USPTO Final Rejection for U.S. Appl. No. 10/001,478 dated Jun. 4, 2008; 18 pages.

USPTO Non-Final Rejection for U.S. Appl. No. 10/001,478 dated Jan. 30, 2008; 19 pages.

USPTO Final Rejection for U.S. Appl. No. 10/001,478 dated Sep. 17, 2007; 15 pages.

USPTO Non-Final Rejection for U.S. Appl. No. 10/001,478 dated Apr. 2, 2007; 17 pages.

USPTO Final Rejection for U.S. Appl. No. 10/001,478 dated Sep. 5, 2006; 19 pages.

USPTO Non-Final Rejection for U.S. Appl. No. 10/001,478 dated Mar. 15, 2006; 19 pages.

USPTO Final Rejection for U.S. Appl. No. 10/001,478 dated Oct. 24, 2005; 15 pages.

USPTO Non-Final Rejection for U.S. Appl. No. 10/001,478 dated May 16, 2005; 13 pages.

USPTO Notice of Allowance for U.S. Appl. No. 10/002,217 dated Jan. 28, 2009; 4 pages.

USPTO Notice of Allowance for U.S. Appl. No. 10/002,217 dated Oct. 14, 2008; 6 pages.

USPTO Notice of Allowance for U.S. Appl. No. 10/002,217 dated Jun. 6, 2008; 7 pages.

USPTO Final Rejection for U.S. Appl. No. 10/002,217 dated Feb. 6, 2008; 10 pages.

USPTO Non-Final Rejection for U.S. Appl. No. 10/002,217 dated Aug. 3, 2007; 10 pages.

USPTO Final Rejection for U.S. Appl. No. 10/002,217 dated Mar. 7, 2007; 12 pages.

USPTO Non-Final Rejection for U.S. Appl. No. 10/002,217 dated Oct. 2, 2006; 21 pages.

USPTO Non-Final Rejection for U.S. Appl. No. 10/002,217 dated Apr. 3, 2006; 12 pages.

USPTO Final Rejection for U.S. Appl. No. 10/002,217 dated Nov. 17, 2005; 17 pages.

USPTO Non-Final Rejection for U.S. Appl. No. 10/002,217 dated May 19, 2005; 15 pages.

USPTO Advisory Action for U.S. Appl. No. 10/001,477 dated Oct. 10, 2008; 3 pages.

"An Analog PPL-Based Clock and Data Recovery Circuit with High Input Jitter Tolerance," Sun, Reprinted from IEEE Journal of Solid-State Circuits, 1989; 4 pages.

"WP 3.5: An Integrated Time Reference," Blauschild, Digest of Technical Papers, 1994; 4 pages.

"Micropower CMOS Temperature Sensor with Digital Output," Bakker et al., IEEE Journal of Solid-State Circuits, 1996; 3 pages.

U.S. Appl. No. 09/964,991: "A Novel Band-Gap Circuit for Providing an Accurate Reference Voltage Compensated for Process State, Process Variations and Temperature," Kutz et al., filed on Sep. 26, 2001; 25 pages.

U.S. Appl. No. 09/842,966: "Precision Crystal Oscillator Circuit Used in Microcontroller," Monte Mar, filed on Apr. 25, 2001; 28 pages.

USPTO Non-Final Rejection for U.S. Appl. No. 09/975,115 dated Oct. 9, 2008; 34 pages.

USPTO Final Rejection for U.S. Appl. No. 09/975,115 dated May 12, 2008; 33 pages.

USPTO Non-Final Rejection for U.S. Appl. No. 09/975,115 dated Jan. 7, 2008; 30 pages.
USPTO Non-Final Rejection for U.S. Appl. No. 09/975,115 dated Jul. 31, 2007; 28 pages.
USPTO Final Rejection for U.S. Appl. No. 09/975,115 dated Feb. 21, 2007; 25 pages.
USPTO Non-Final Rejection for U.S. Appl. No. 09/975,115 dated Oct. 31, 2006; 19 pages.
USPTO Final Rejection for U.S. Appl. No. 09/975,115 dated Jun. 23, 2006; 20 pages.
USPTO Non-Final Rejection for U.S. Appl. No. 09/975,115 dated Jan. 11, 2006; 15 pages.
USPTO Non-Final Rejection for U.S. Appl. No. 09/975,115 dated Jul. 27, 2005; 11 pages.
USPTO Non-Final Rejection for U.S. Appl. No. 09/975,115 dated Feb. 11, 2005; 86 pages.
USPTO Final Rejection for U.S. Appl. No. 09/975,338 dated Jan. 31, 2008; 21 pages.
USPTO Non-Final Rejection for U.S. Appl. No. 09/975,338 dated Aug. 14, 2007; 19 pages.
USPTO Final Rejection for U.S. Appl. No. 09/975,338 dated Feb. 27, 2007; 23 pages.
USPTO Non-Final Rejection for U.S. Appl. No. 09/975,338 dated Sep. 6, 2006; 11 pages.
USPTO Advisory Action for U.S. Appl. No. 09/975,338 dated May 15, 2006; 4 pages.
USPTO Final Rejection for U.S. Appl. No. 09/975,338 dated Jan. 18, 2006; 12 pages.
USPTO Non-Final Rejection for U.S. Appl. No. 09/975,338 dated Apr. 5, 2005; 13 pages.
USPTO Final Rejection for U.S. Appl. No. 10/008,096 dated Feb. 10, 2005; 15 pages.
USPTO Final Rejection for U.S. Appl. No. 10/008,096 dated Jun, 16, 2008; 23 pages.
USPTO Final Rejection for U.S. Appl. No. 10/008,096 dated Sep. 4, 2007; 19 pages.
USPTO Final Rejection for U.S. Appl. No. 10/008,096 dated Oct. 13, 2006; 17 pages.
USPTO Final Rejection for U.S. Appl. No. 10/008,096 dated Nov. 25, 2005; 17 pages.
USPTO Non-Final Rejection for U.S. Appl. No. 10/008,096 dated Mar. 7, 2007; 19 pages.
USPTO Non-Final Rejection for U.S. Appl. No. 10/008,096 dated Apr. 17, 2006; 18 pages.
USPTO Non-Final Rejection for U.S. Appl. No. 10/008,096 dated Jun. 14, 2004; 24 pages.
USPTO Non-Final Rejection for U.S. Appl. No. 10/008,096 dated Jun. 24, 2005; 15 pages.
USPTO Non-Final Rejection for U.S. Appl. No. 10/008,096 dated Dec. 12, 2007; 14 pages.
USPTO Notice of Allowance for U.S. Appl. No. 10/008,096 dated Dec. 22, 1008; 24 pages.
USPTO Notice of Allowance for U.S. Appl. No. 09/975,105 dated Dec. 4, 2006; 4 pages.
USPTO Final Rejection for U.S. Appl. No. 09/975,105 dated Jun. 13, 2006; 7 pages.
USPTO Non-Final Rejection for U.S. Appl. No. 09/975,105 dated Jan 19, 2006; 5 pages.
USPTO Non-Final Rejection for U.S. Appl. No. 09/975,105 dated Apr. 19, 2005; 9 pages.
U.S. Appl. No. 09/943,062: "Apparatus and Method for Programmable Power Management in a Programmable Analog Circuit Block," Monte Mar, filed on Aug. 29, 2001; 46 pages.
U.S. Appl. No. 10/238,966: "Method for Parameterizing a User Module," Perrin et al., filed on Sep. 9, 2002; 41 pages.
USPTO Notice of Allowance for U.S. Appl. No. 10/324,455 dated Feb. 12, 2004; 4 pages.
USPTO Non-Final Rejection for U.S. Appl. No. 10/324,455 dated Nov. 6, 2003; 4 pages.
USPTO Non-Final Rejection for U.S. Appl. No. 10/324,455 dated Aug. 21, 2003; 4 pages.
USPTO Notice of Allowance for U.S. Appl. No. 09/998,859 dated Mar. 14, 2005; 6 pages.
USPTO Non-Final Rejection for U.S. Appl. No. 09/998,859 dated Nov. 4, 2004; 6 pages.
USPTO Final Rejection for U.S. Appl. No. 09/998,859 dated Nov. 19, 2003; 5 pages.
USPTO Non-Final Rejection for U.S. Appl. No. 09/998,859 dated May 28, 2003; 6 pages.
USPTO Non-Final Rejection for U.S. Appl. No. 09/998,859 dated May 15, 2003; 6 pages.
USPTO Notice of Allowance for U.S. Appl. No. 09/998,834 dated May 19, 2005; 7 pages.
USPTO Non-Final Rejection for U.S. Appl. No. 09/998,834 dated Sep. 20, 2004; 11 pages.
USPTO Notice of Allowance for U.S. Appl. No. 10/113,065 dated Apr. 6, 2006; 8 pages.
USPTO Final Rejection for U.S. Appl. No. 10/113,065 dated Oct. 26, 2005; 17 pages.
USPTO Non-Final Rejection for U.S. Appl. No. 10/113,065 dated May 20, 2005; 14 pages.
U.S. Appl. No. 09/207,912: "Circuit(s), Architecture and Method(s) for Operating and/or Tuning a Ring Oscillator," Monte Mar, filed on Dec. 9, 1998; 23 pages.
USPTO Notice of Allowance for U.S. Appl. No. 10/001,477 dated May 8, 2009; 6 pages.
Goodenough, F. "Analog Counterparts of FPGAS Ease System Design" Electronic Design, Penton Publishing, Cleveland, OH, US vol. 42, No. 21, Oct. 14, 1994; 10 pages.
Harbaum, T. et al. "Design of a Flexible Coprocessor Unit" Proceedings of the Euromicro Conference, XX XX, Sep. 1999; 10 pages.
USPTO U.S. Appl. No. 09/924,734: "Programmable Microcontroller (PSoC) Architecture (Mixed Analog/Digital)"; Snyder et al., filed on Aug. 7, 2001; 28 pages.
USPTO U.S. Appl. No. 09/909,045: "Digital Configurable Macro Architecture," Warren Snyder, filed on Jul. 18, 2001; 37 pages.
USPTO U.S. Appl. No. 09/909,109: "Configuring Digital Functions in a Digital Configurable Macro Architecture," Warren Snyder, filed on Jul. 18, 2001; 38 pages.
USPTO U.S. Appl. No. 09/909,047: "A Programmable Analog System Architecture," Monte Mar, filed on Jul. 18, 2001; 60 pages.
USPTO U.S. Appl. No. 09/930,021: "Programmable Methodology and Architecture for a Programmable Analog System"; Mar et al., filed on Aug. 14, 2001; 87 pages.
USPTO U.S. Appl. No. 09/969,311: "Method for Synchronizing and Resetting Clock Signals Supplied to Multiple Programmable Analog Blocks," Bert Sullam, filed on Oct. 1, 2001; 57 pages.
USPTO U.S. Appl. No. 09/875,599: "Method and Apparatus for Programming a Flash Memory," Warren Snyder, filed on Jun. 5, 2001; 23 pages.
USPTO U.S. Appl. No. 09/975,115: "In-System Chip Emulator Architecture," Snyder et al., filed on Oct. 10, 2001; 38 pages.
USPTO U.S. Appl. No. 09/953,423: "A Configurable Input/Output Interface for a Microcontroller," Warren Snyder, filed on Sep. 14, 2001; 28 pages.
USPTO U.S. Appl. No. 09/893,050: "Multiple Use of Microcontroller Pad," Kutz et al., filed on Jun. 26, 2001; 21 pages.
USPTO U.S. Appl. No. 09/929,891: "Programming Architecture for a Programmable Analog System," Mar et al., filed on Aug. 14, 2001; 82 pages.
USPTO U.S. Appl. No. 09/969,313: "Architecture for Synchronizing and Resetting Clock Signals Supplied to Multiple Analog Programmable Analog Blocks," Bert Sullam, filed on Oct. 1, 2001; 50 pages.
USPTO Non-Final Rejection for U.S. Appl. No. 09/994,601 dated Nov. 14, 2006; 15 pages.
USPTO Final Rejection for U.S. Appl. No. 09/994,601 dated Mar. 8, 2006; 11 pages.
USPTO Non-Final Rejection for U.S. Appl. No. 09/994,601 dated Sep. 21, 2005; 12 pages.
USPTO Final Rejection for U.S. Appl. No. 09/994,601 dated Mar. 24, 2005; 10 pages.
Hintz et al., "Microcontrollers", 1992, McGraw-Hill; 11 pages.
Ganapathy et al., "Hardware Emulation for Functional Verification of K5", Jun. 1996, 33rd Design Automation Conference Proceedings, Jun. 3-7, 1996; 4 pages.

The Provisional U.S. Appl. No. 60/243,708 "Advanced Programmable Microcontroller Device"; Snyder et al., filed on Oct. 26, 2000; 277 pages.

"Webster's Third New International Dictionary", 1996, G. & C. Merriam Company; 3 pages (including pp. 1328-1329).

USPTO Advisory Action for U.S. Appl. No. 09/998,848 dated Sep. 7, 2005; 3 pages.

USPTO U.S. Appl. No. 09/957,084: "A Crystal-Less Oscillator with Trimmable Analog Current Control for Increased Stability," Mar et al., filed on Sep. 19, 2001; 28 pages.

USPTO U.S. Appl. No. 10/011,214: "Method and Circuit for Synchronizing a Write Operation between an On-Chip Microprocessor and an On-Chip Programmable Analog Device Operating at Different Frequencies," Sullam et al., filed on Oct. 25, 2001; 49 pages.

USPTO U.S. Appl. No. 09/972,319: "Method for Applying Instructions to Microprocessor in Test Mode," Warren Snyder, filed on Oct. 5, 2001; 31 pages.

USPTO U.S. Appl. No. 09/972,003: "Test Architecture for Microcontroller Providing for a Serial Communication Interface," Warren Snyder, filed on Oct. 5, 2001; 32 pages.

USPTO U.S. Appl. No. 09/972,133: "Method for Entering Circuit Test Mode," Warren Snyder, filed on Oct. 5, 2001; 30 pages.

USPTO U.S. Appl. No. 09/973,535: "Architecture for Decimation Algorithm," Warren Snyder, filed on Oct. 9, 2001; 26 pages.

USPTO U.S. Appl. No. 09/977,111: "A Frequency Doubler Circuit with Trimmable Current Control," Shutt et al., filed on Oct. 11, 2001; 35 pages.

USPTO U.S. Appl. No. 10/272,231: "Digital Configurable Macro Architecture," Warren Snyder, filed on Oct. 15, 2002; 36 pages.

USPTO U.S. Appl. No. 11/125,554: "A Method for a Efficient Supply to a Microcontroller," Kutz et al., filed on May 9, 2005; 1 page.

USPTO U.S. Appl. No. 09/855,868: "Protecting Access to Microcontroller Memory Blocks," Warren Snyder, filed on May 14, 2001; 28 pages.

USPTO U.S. Appl. No. 09/887,923: "Novel Method and System for Interacting between a Processor and a Power on Reset to Dynamically Control Power States in a Microcontroller," Kutz et al., filed on Jun. 22, 2001; 44 pages.

USPTO U.S. Appl. No. 10/000,383: "System and Method of Providing a Programmable Clock Architecture for an Advanced Microcontroller," Sullam et al., filed on Oct. 24, 2001; 34 pages.

USPTO U.S. Appl. No. 10/001,477: "Breakpoint Control in an In-Circuit Emulation System," Roe et al., filed on Nov. 1, 2001; 43 pages.

USPTO U.S. Appl. No. 10/004,197: "In-Circuit Emulator with Gatekeeper Based Halt Control," Nemecek et al., filed on Nov. 14, 2001; 47 pages.

USPTO U.S. Appl. No. 10/004,039: "In-Circuit Emulator with Gatekeeper for Watchdog Timer," Nemecek et al., filed on Nov. 14, 2001; 46 pages.

USPTO U.S. Appl. No. 10/002,217: "Conditional Branching in an In-Circuit Emulation System," Craig Nemecek, filed on Nov. 1, 2001; 43 pages.

USPTO U.S. Appl. No. 10/001,568: "Combined In-Circuit Emulator and Programmer," Nemecek et al., filed on Nov. 1, 2001; 47 pages.

USPTO U.S. Appl. No. 10/001,478: "In-Circuit Emulator and POD Synchronized Boot," Nemecek et al., filed on Nov. 1, 2001; 44 pages.

USPTO U.S. Appl. No. 09/887,955: "Novel Power on Reset Circuit for Microcontroller," Kutz et al., filed on Jun. 22, 2001; 42 pages.

USPTO U.S. Appl. No. 09/826,397: "Method and Circuit for Allowing a Microprocessor to Change its Operating Frequency on-the-Fly," Bert Sullam, filed on Apr. 2, 2001; 24 pages.

USPTO U.S. Appl. No. 09/893,048: "A Microcontroller having an On-Chip High Gain Amplifier," Kutz et al., filed on Jun. 26, 2001; 22 pages.

USPTO U.S. Appl. No. 09/912,768: "A Microcontroller having a Dual Mode Relax Oscillator that is Trimmable," James Shutt; filed on Jul. 24, 2001; 33 pages.

USPTO U.S. Appl. No. 09/922,419: "A Power Supply Pump Circuit for a Microcontroller," Kutz et al., filed on Aug. 3, 2001; 38 pages.

USPTO U.S. Appl. No. 09/922,579: "A Method for a Efficient Supply to a Microcontroller," Kutz et al., filed on Aug. 3, 2001; 37 pages.

USPTO U.S. Appl. No. 09/923,461: "Non-Interfering Multiply-Mac (Multiply Accumulate) Circuit," Warren Snyder, filed on Aug. 6, 2001; 25 pages.

USPTO U.S. Appl. No. 09/935,454: "Method and Apparatus for Local and Global Power Management in a Programmable Analog Circuit," Monte Mar, filed on Aug. 22, 2001; 1 page.

* cited by examiner

METHOD AND AN APPARATUS TO DESIGN A PROCESSING SYSTEM USING A GRAPHICAL USER INTERFACE

REFERENCE TO RELATED APPLICATION

This application claims the benefit of U.S. Provisional Application No. 60/601,303, filed on Aug. 13, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to processing systems, and more particularly, to designing a processing system using a graphical user interface (GUI).

BACKGROUND

Semiconductor processing systems having processing devices are widely used in modem products, such as automobiles, cell phones, kitchen appliances, and video gaming devices, etc. to perform a variety of complex functions. For instance, programmable devices, such as microcontrollers, field programmable gate array (FPGA), and programmable logic devices (PLDs), are commonly used to provide this variety in an economical manner.

Conventionally, designing a processing system using a general-purpose processing device typically involves a programmer familiar with both the application or product in which the processing system is to be used, and the capacity and limitations of the processing system. In general, the design sequence involves determining the requirements of the application, programming a solution using the processing device based upon what is known of the system's requirements, and adding to, deleting from, or completely re-writing processing device code (also referred to as embedded firmware) for the processing device as the system requirements change. Thus, many typical implementations, which begin simply with an 'if-then-else' code statement, or a case structure, generally grow organically to an unwieldy, hard-to-understand, hard-to-verify, and unmaintainable implementation.

For example, one commonly used technique for defining or mapping output behavior for a processing system uses truth tables. However, there are many possible firmware implementations of a truth table, depending upon a programmer's skills in framing the system problem as well as technical coding skills.

Yet another problem in designing or configuring processing systems arises from the need to convert variable and continuous input signals to a number of discrete values, each having one or more setpoints or threshold values and select hysteresis associated therewith. In a typical sensing and control system, input devices usually produce a continuous range of values, but the system has to act discretely, or operate in one of a discrete set of states. Furthermore, the required hysteresis has to be explicitly specified and treated as additional thresholds. According to one conventional approach to convert an input from continuous to discrete, a user first selects the actual threshold values and hysteresis required for a particular continuous input (such as writing down or capturing the continuous input). Then the user writes embedded firmware to choose an input and to compare the chosen input to one or more thresholds, applying hysteresis as defined.

Moreover, to change the values of the thresholds, the user has to update elements of the embedded firmware (e.g., constants, variables). Alternatively, a communication interface and/or protocol with more firmware is employed to interpret commands and modify thresholds.

BRIEF DESCRIPTION OF THE DRAWINGS

The present invention will be understood more fully from the detailed description that follows and from the accompanying drawings, which however, should not be taken to limit the appended claims to the specific embodiments shown, but are for explanation and understanding only.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term "coupled" as used herein may mean either directly coupled or indirectly coupled through one or more intervening components.

In one embodiment, a user is allowed to define a transfer function via a graphical user interface (GUI). Then the transfer function may be submitted to a processing device maker associated with a processing device. Based on the transfer function submitted, the processing device maker may generate processing device code without intervention by the user. The processing device code, when executed by the processing device, is configured to cause the processing device to perform the transfer function.

The processing device may include one or more general-purpose processing devices, such as a microprocessor or central processing unit, a network processor, a microcontroller, an embedded programmable logic device (PLD), or the like.

Alternatively, the processing device may include one or more special-purpose processing devices, such as a digital signal processor (DSP), an application specific integrated circuit (ASIC), a field programmable gate array (FPGA), or the like. The processing device may also include any combination of a general-purpose processing device and a special-purpose processing device.

Figure 1:
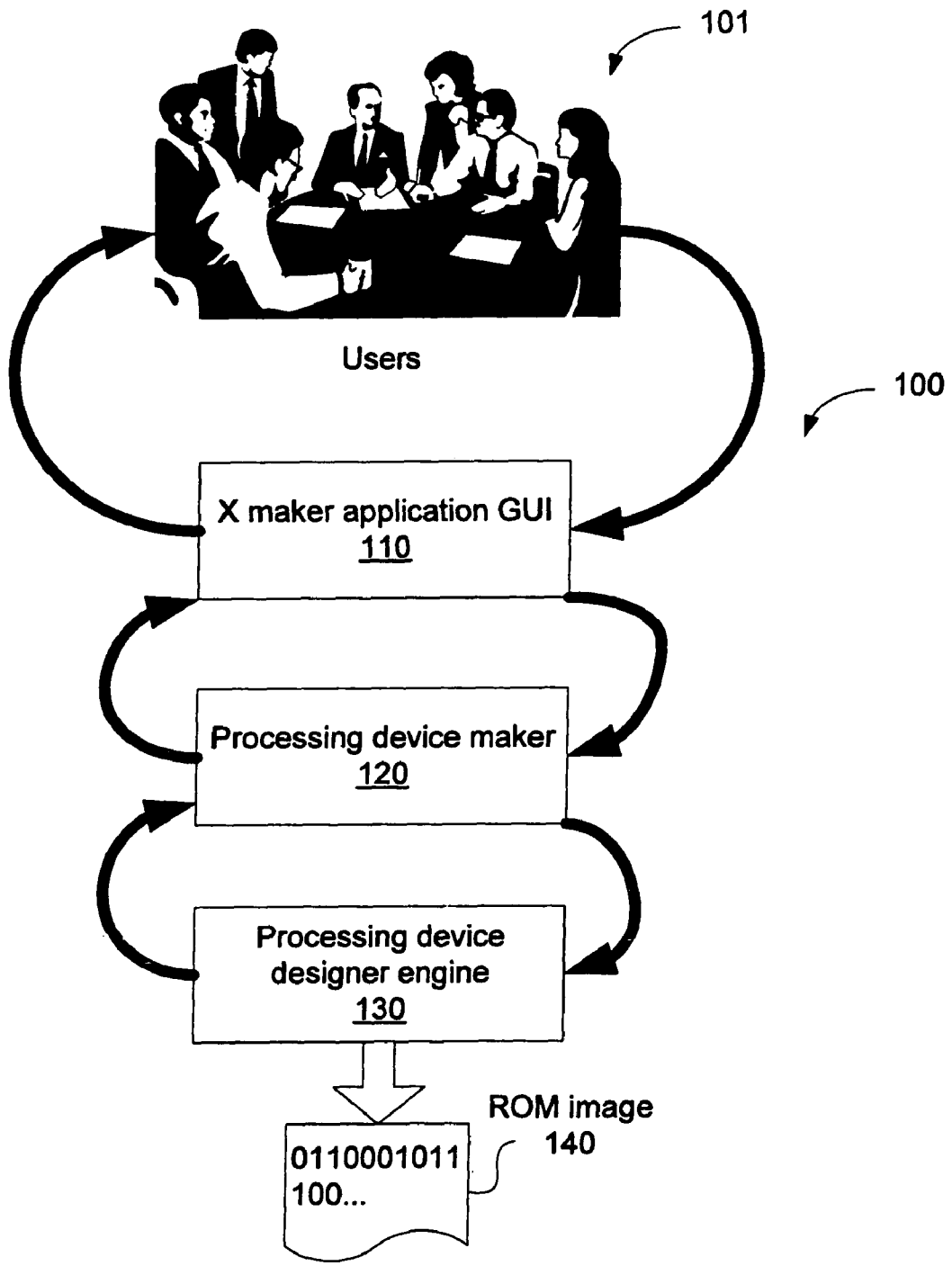
FIG. 1 shows a functional block diagram of a computer application to design a processing system having a processing device.

FIG. 1 shows a functional block diagram of one embodiment of a computer application for designing, implementing, and programming systems having a processing device using a GUI. It is to be understood that this is a functional illustration of a generic X maker application 100, where "X" is the function or name of a product finally made using the application 100. It is not a structural block diagram of the application. For example, the X maker application 100 may be a fan controller maker. In one embodiment, the X maker application 100 includes a GUI 110, a processing device maker 120, and a processing device designer engine 130. The GUI 110 provides a direct interface to users 101 on one side. On the other side, the GUI 110 interfaces with a processing device maker 120, which provides various services, including code generation, simulation, and document generation, etc. The GUI 110 represents to the users 101 the processing device maker 120 that services in the context of the system to be controlled, for example, in the context of a fan control system.

In one embodiment, the processing device maker 120 includes an application and a framework of services that enables or services the X maker application 100, such as a fan controller maker. The X maker application 100 in turn allows the users 101 to create a processing device-based application without directly interfacing with the processing device designer engine 130 or writing any processing device code. During operation, the GUI 110 may call the processing device maker 120. In response to the call, the processing device maker 120 may call the processing device designer engine 130 via a command interface. In one embodiment, the processing device maker 120 takes the user's selections from the GUI 110 to define a transfer function, generates processing device code to implement the transfer function defined, inputs the processing device code into the processing device designer engine 130 to generate a ROM image 140. The processing device maker 120 may further support simulation of the user's selections and the transfer function to allow intuitive application design and validation to a large degree without a hardware platform.

In one embodiment, the processing device maker 120 is designed on a standard Windows/Personal Computer (PC) platform using web-based technologies (e.g., HTML, JavaScript, etc.). Alternatively, other platforms may be used, for example, UNIX-based platform, Mac-based platform, etc. In general, the X maker application 100 development may be platform specific, as long as the functionality developed does not preclude ultimate transfer to a web-based technology platform.

In one embodiment, the resulting processing device code supports a standard Inter-Integrated Circuits (I2C) register/command interface. The processing device code may further enable the users 101 to shape the details of the I2C register/command interface. The processing device code may also protect its control portion from improper and/or inadvertent actions by the users 101 without restricting the users 101 unduly.

Figure 2A:
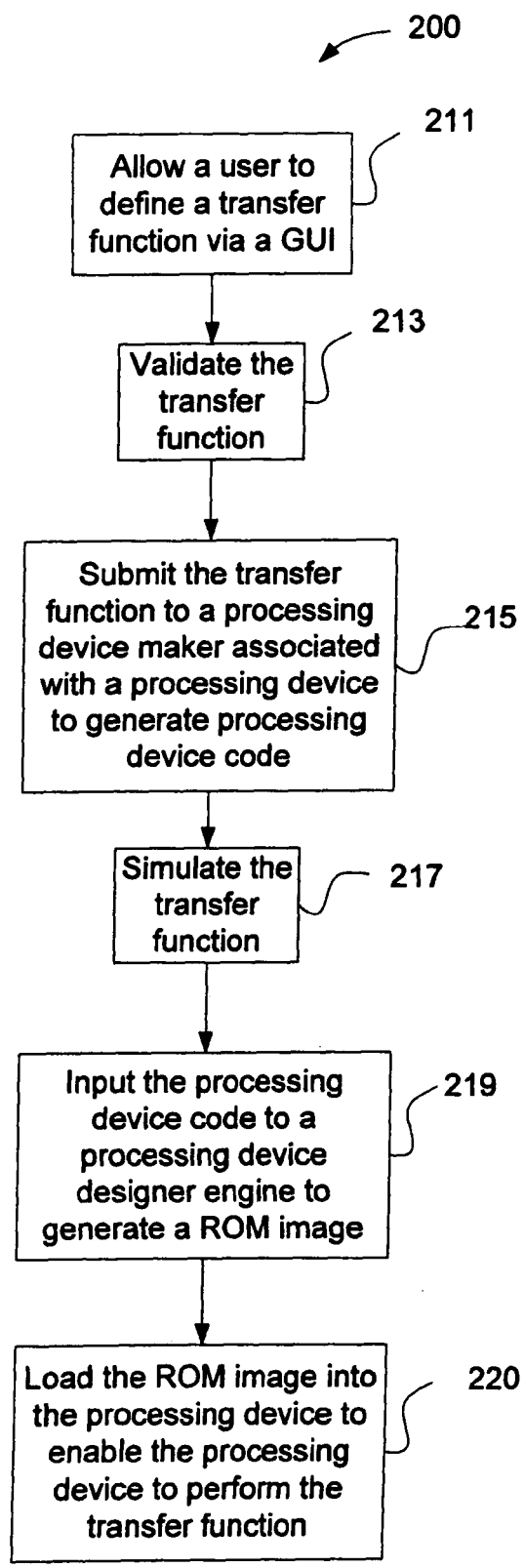
FIG. 2A shows one embodiment of a process to design a processing system using a graphical user interface.

FIG. 2A shows one embodiment of a process 200 to design a processing system using a graphical user interface. The process is performed by processing logic that may comprise hardware (e.g., circuitry, dedicated logic, etc.), software (such as is run on a general-purpose computer system, or a dedicated machine), or a combination of both.

Initially, processing logic for process 200 allows a user to define a transfer function via a GUI (processing block 211). The GUI may be generated in a variety of ways, such as using HTML, JavaScript, etc. The GUI may include various user interface control (e.g., buttons, input fields, drop-down menus, etc.) to allow the user to input values of parameters, to modify values of the parameters, and/or to select one or more object from a predetermined group of objects. Processing logic for process 200 may allow the user to select a type of transfer function from a variety of transfer function types. In one embodiment, the transfer function types include a truth table transfer function for mapping specific output actions and/or output states to permutations of discrete inputs. In another embodiment, the transfer function types include a setpoint transfer function to convert a continuous input signal to a number of discrete values, each with selectable hysteresis. Then processing logic for process 200 may allow the user to provide a number of inputs to the transfer function and to assign an output state to each combination of the inputs. After the transfer function is defined, processing logic for process 200 may validate the transfer function (processing block 213). If the transfer function is determined to be invalid, processing logic may output an error message to the user.

In some embodiments, processing logic for process 200 submits the transfer function to a processing device maker 120 associated with the processing device to generate processing device code (processing block 215). In some embodiments, processing logic for process 200 simulates the transfer function without running the processing device (processing block 217). Such simulation makes it easier for the user to test the transfer function defined and provides faster turn-around because the processing device is not run in simulation. Then processing logic for process 200 inputs the processing device code to a processing device designer engine to generate a read-only memory (ROM) image (processing block 219). The ROM image is generated based on the processing device code, which includes instructions to the processing device. Finally, processing logic for process 200 may load the ROM image into the processing device to enable the processing device to perform the transfer function (processing block 220). In some embodiments, the ROM image is loaded into the processing device using a programmer with the processing device mounted on the targeted hardware of the processing system. Once the ROM image is loaded into the processing device. The processing device may read the ROM image in whole or in parts to retrieve the instructions. In response to the instructions, the processing device may perform the transfer function defined by the user.

Figure 2B:
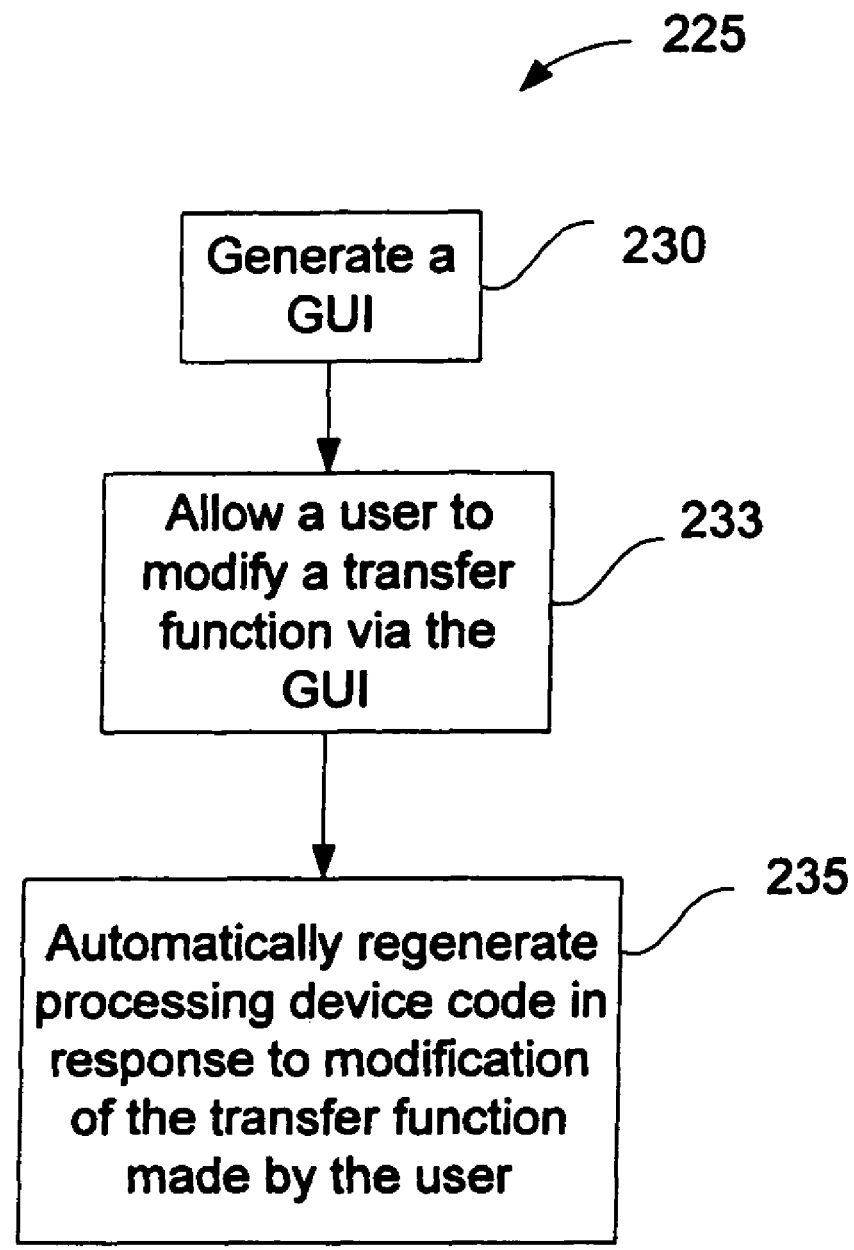
FIG. 2B shows one embodiment of a process to modify a design of a processing system using a graphical user interface.

FIG. 2B shows one embodiment of a process to modify a design of a processing system using a GUI. The process 225 is performed by processing logic that may comprise hardware (e.g., circuitry, dedicated logic, etc.), software (such as is run on a general-purpose computer system, or a dedicated machine), or a combination of both.

Processing logic for process 225 generates a GUI (processing block 230). The GUI may include various user interface control (e.g., buttons, input fields, drop-down menus, etc.). The user interface control allows a user to input parameters, to modify values of the parameters, and/or to select one or more objects from a group of predetermined objects. Processing logic for process 225 allows the user to modify a transfer function via the GUI (processing block 233). The transfer function may have been defined earlier by some embodiments of the process discussed above with reference to FIG. 2A. In some embodiments, the user changes the values of the parameters, add new parameters, and/or remove existing parameters using the user interface control in the GUI. In response to modification of the transfer function made by the user, processing logic for process 225 automatically regenerates processing device code (processing block 235). In some embodiments, processing logic for process 225 may further generate a ROM image based on the regenerated processing device code. Furthermore, the ROM image generated may be loaded into the processing device to cause the processing device to perform the modified transfer function.

Figure 3A:
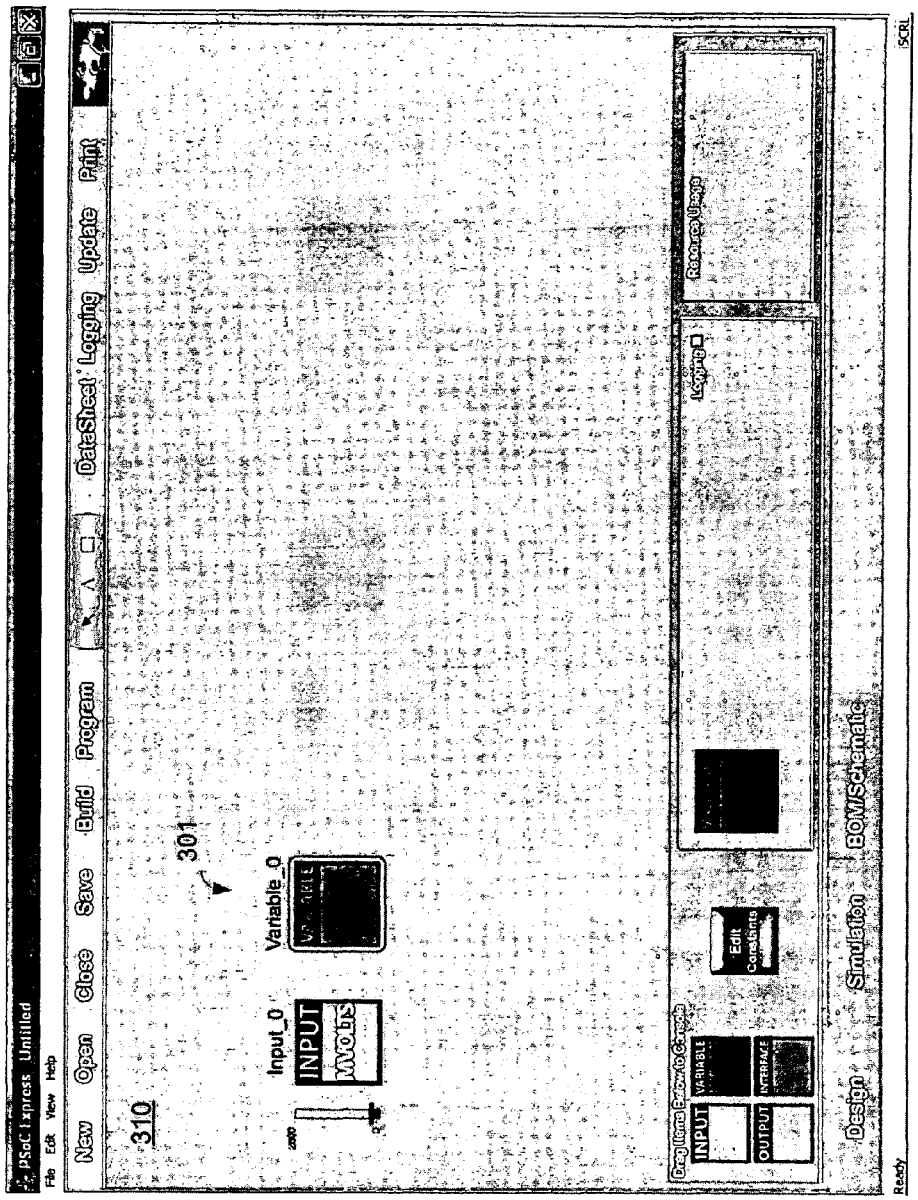
FIGS. 3A-3D show embodiments of a GUI to allow users to design a processing system to implement a truth table transfer function.
Figure 3B:
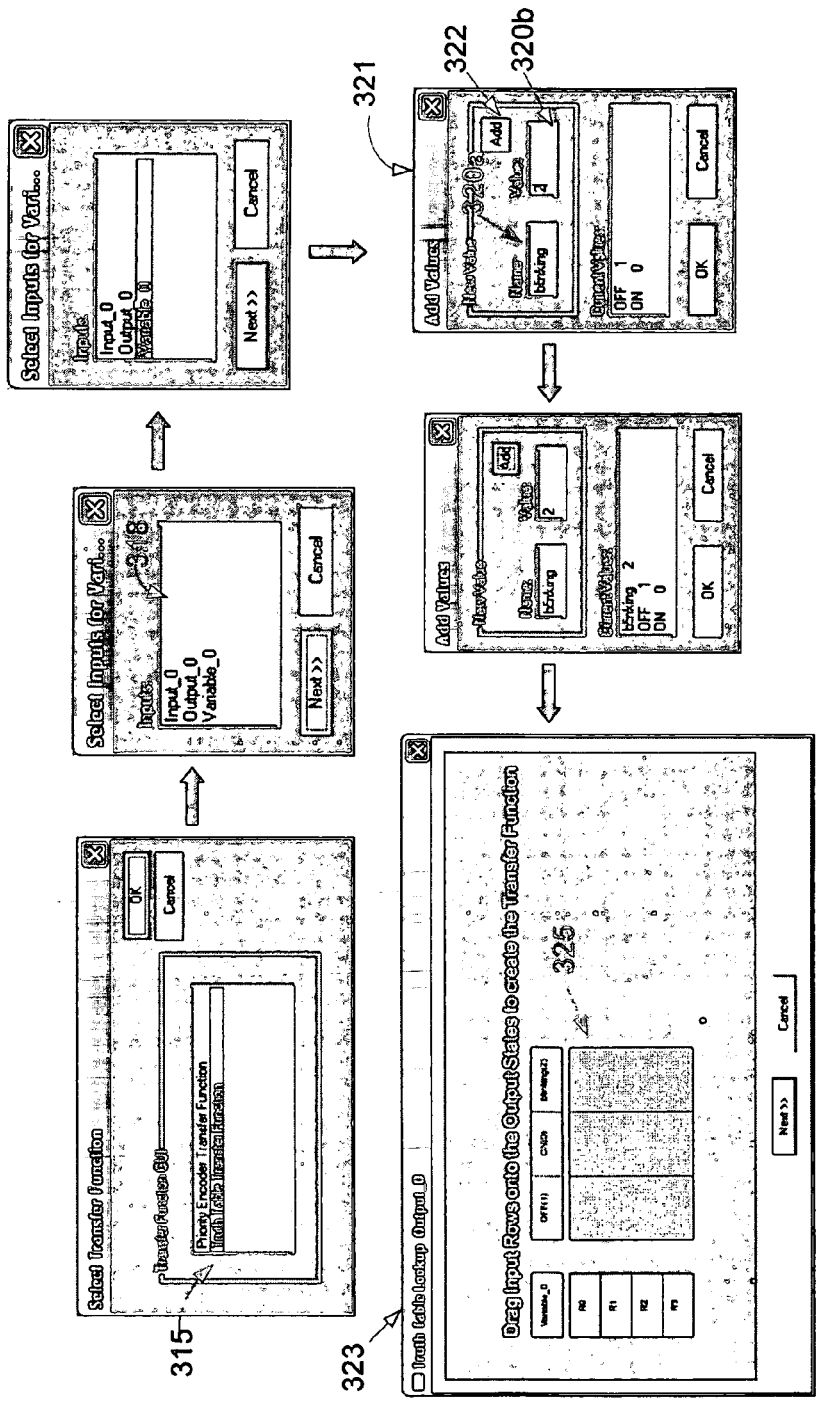
Figure 3C:
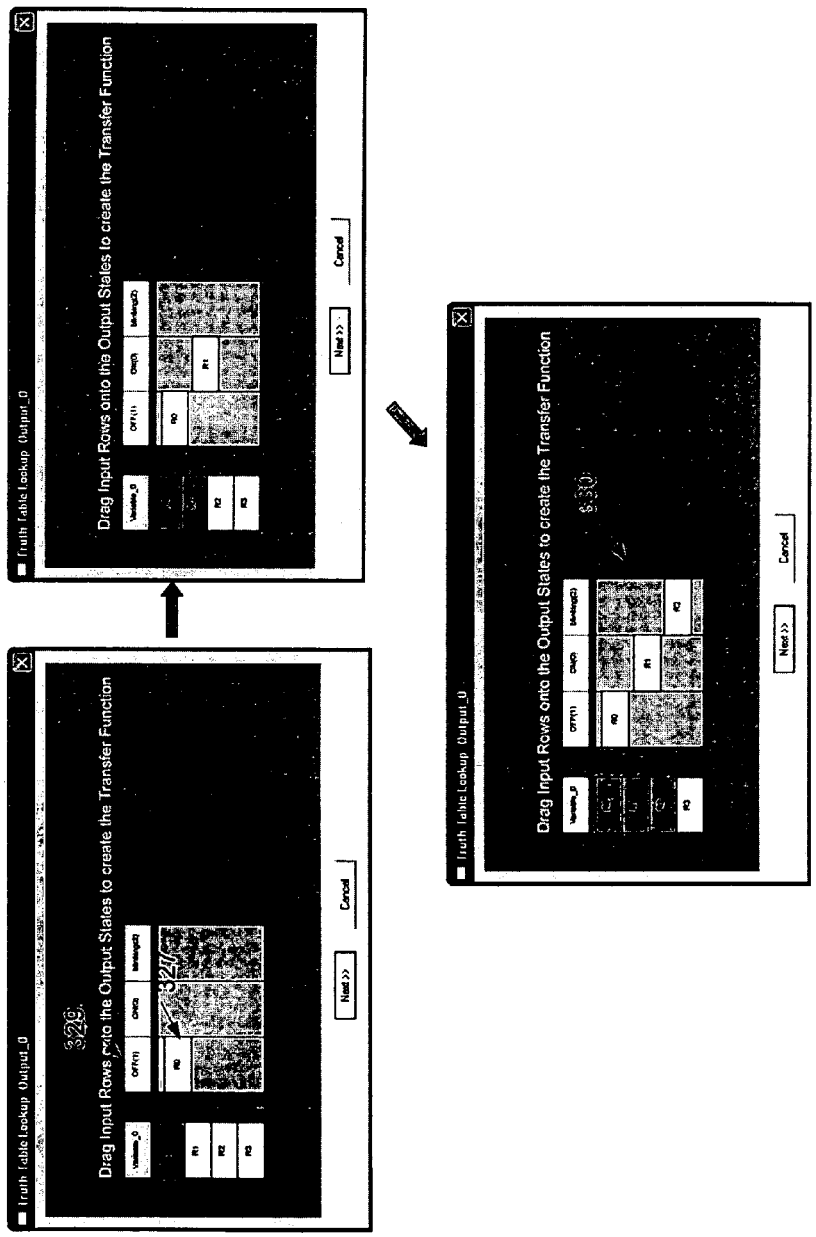

FIGS. 3A-3F illustrate some embodiments of a GUI to allow a user to design a processing system. Referring to FIG. 3A, a user adds a variable object to the processing system by dragging an icon 301 representing the variable object to a console 310. Referring to FIG. 3B, the user then chooses a transfer function type from a list of transfer function types 315. In the current example, the user chooses truth table transfer function. Then the user may select a number of inputs for the transfer function from the list 318. In the current example, the user selects input Variable_0. Then the user may add a number of output states (e.g., ON, OFF, blinking) using the input fields 320a and 320b and the button 322 in the dialog box 321. Then a set of permutations of the inputs and possible output states are presented to the user via the dialog box 323 in a predetermined pattern, such as a truth table 325.

Figure 3D:
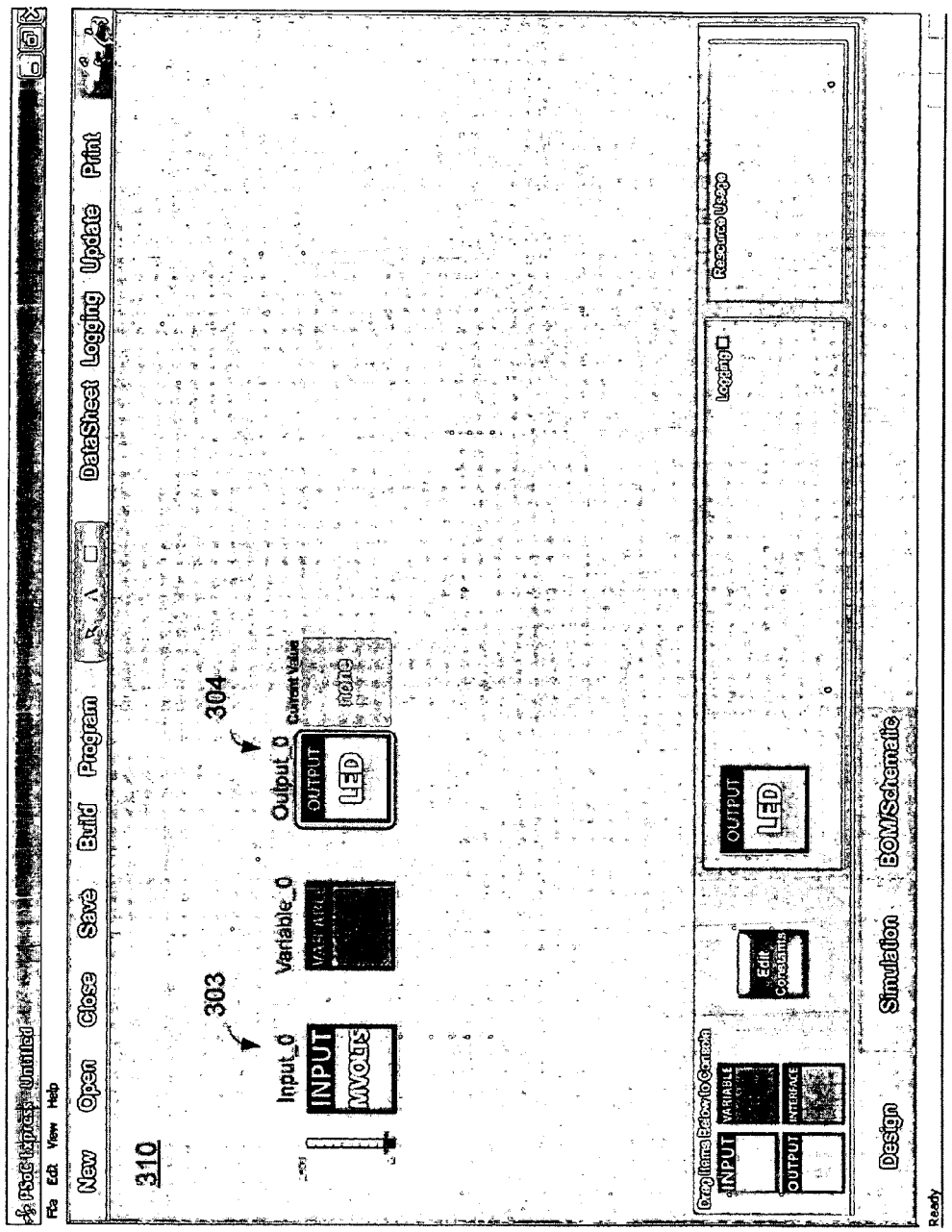

In one embodiment, the user drags a permutation tile to the desired output state column to select which combination of input values set the output to which state. For instance, the permutation tile R0 327 is dragged to the column OFF(1) 329 in FIG. 3C. The user may choose to leave some permutations unassigned, preventing the output from changing states while the inputs are in an unassigned permutation. The resultant truth table 330 shows the input-to-output dependencies of the transfer function. After defining the transfer function, the console 310 may show the output 304 along with the input 303 as shown in FIG. 3D. As illustrated in this example, the GUI provides a clear presentation of the transfer function, the input values, and the output states to the user. The GUI also provides a user-friendly way for the user to define and/or modify the transfer function.

After defining the transfer function in the truth table 330, the transfer function may be input to a processing device designer engine to generate processing device code (also referred to as embedded firmware). As the transfer function defined is put into a predetermined pattern (e.g., a truth table), processing device code may be generated in a predetermined way based on the predetermined pattern. For example, processing device code using a lookup table may be used to implement a truth table transfer function. The processing device code may be loaded into the processing device. In response to the processing device code, the processing device may perform the truth table transfer function by evaluating the inputs to determine the permutation of the inputs and executing a table lookup to find the corresponding output state. In some embodiments, the processing device executes the processing device code to take the discrete inputs, call the truth table transfer function, take the result of the transfer function call, and set the output to the new state.

In one embodiment, the behavior of the number of specific output actions for permutations of possible values of the number of discrete inputs are verified prior to generating processing device code. Furthermore, one or more of the number of specific output states, the discrete inputs, and/or the defined transfer function may be edited by the user via some embodiments of the GUI described above. For example, to change the mapping of permutations or output states, the user may return to the dialog boxes 321 and 323 in FIG. 3B to make the changes.

Figure 3E:
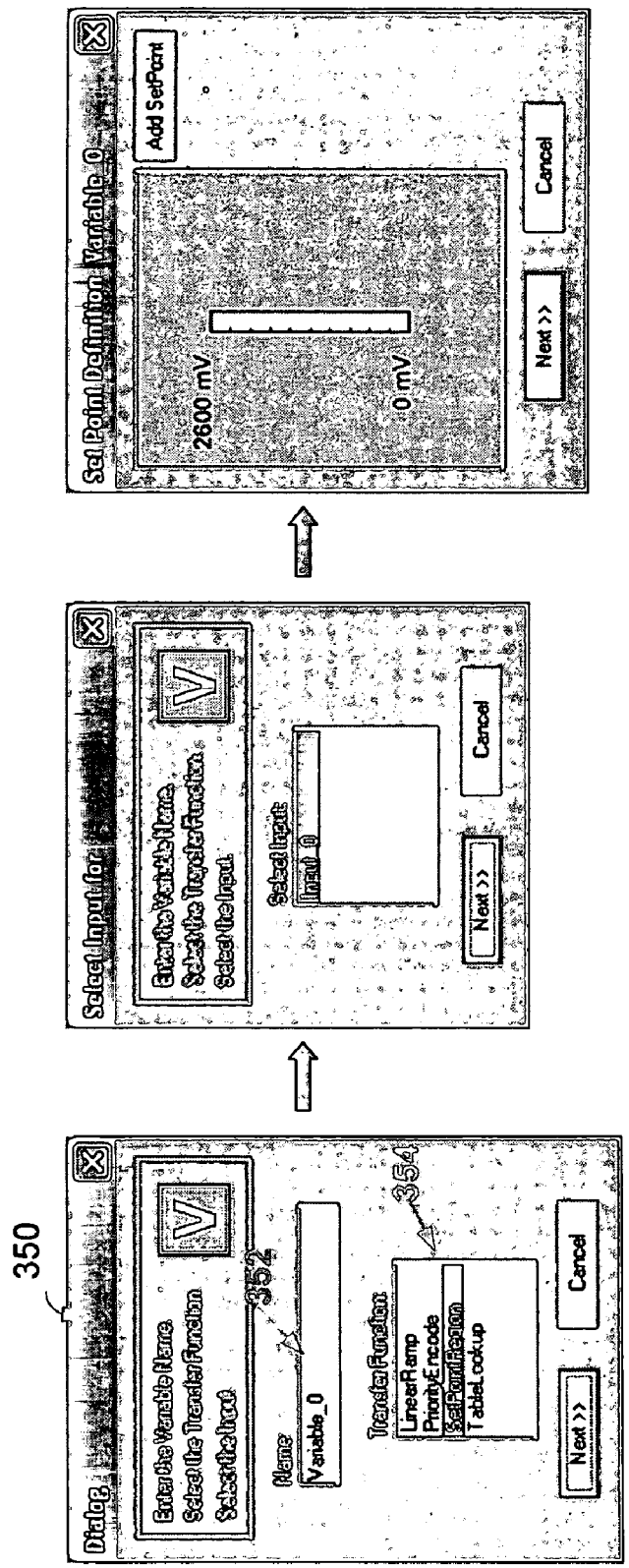
FIGS. 3E and 3F illustrate embodiments of a GUI to enable users to design or program a processing system having a processing device to convert a continuous input signal to a number of discrete values.
Figure 3F:
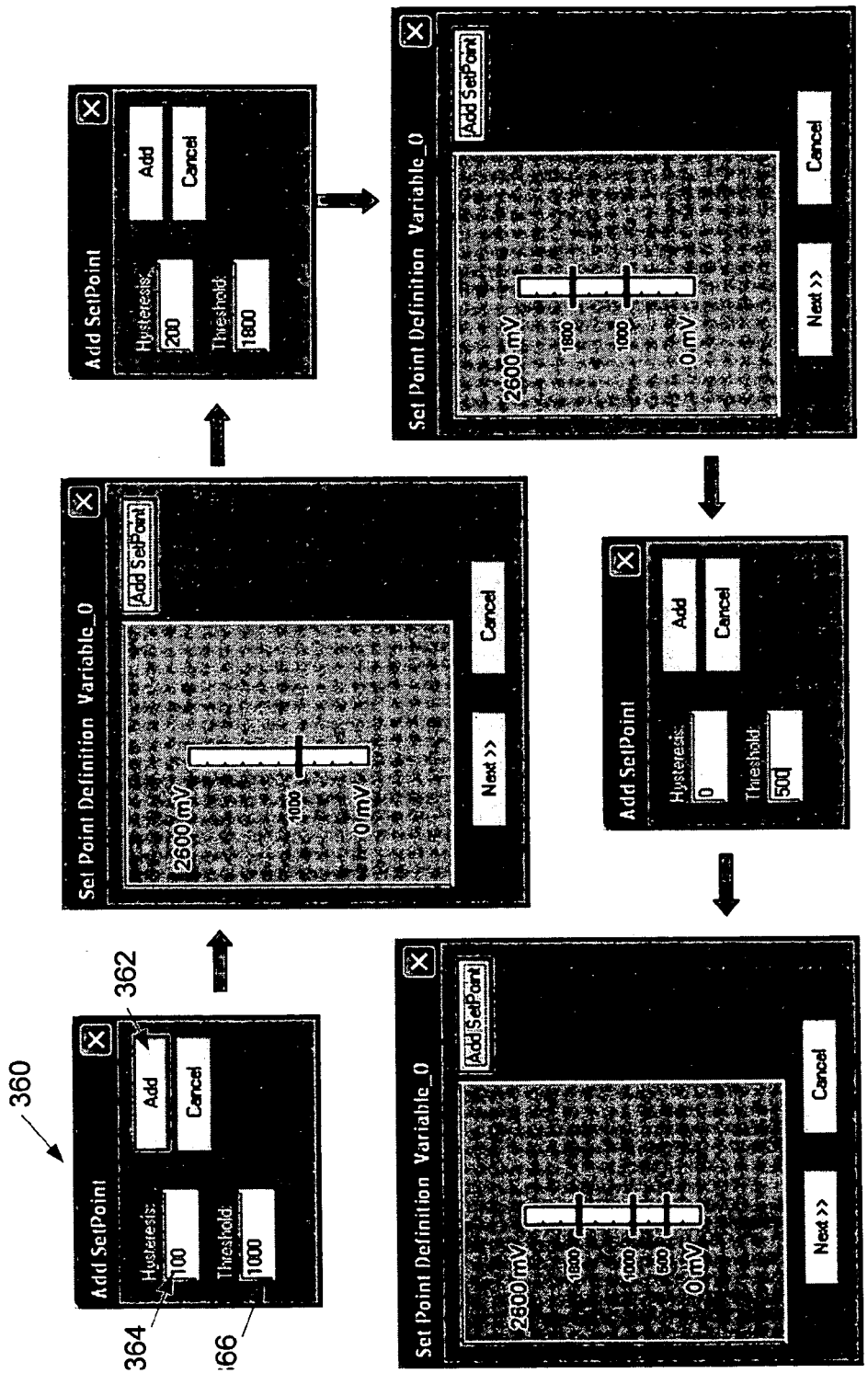

FIGS. 3E and 3F illustrate some embodiments of a GUI to enable users to design or program a processing system having a processing device to convert a continuous input signal to a number of discrete values. Referring to FIG. 3E, a user adds a variable object 352 to the processing system, selects a setpoint transfer function for the variable object from a list 354 in the a dialog box 350. The user then further defines one or more thresholds and inputs the amount of hystersis to apply to that threshold using the input fields 364 and 366 and the "Add" button 362 in the dialog box 360 as shown in FIG. 3F.

In one embodiment, a processing device designer engine generates processing device code (also know as embedded firmware) for the setpoint transfer function. The processing device designer engine may generate a ROM image based upon the processing device code. The ROM image may be loaded into the processing device. When executed, the processing device code is configured to cause the processing device to take the sampled continuous input, call the setpoint function, take the result of the setpoint function call, and take a discrete action based upon the result.

In some embodiments, the behavior of the set point transfer function is verified prior to generating the processing device code. For instance, the continuous input signal may be simulated for a number of predetermined input signal values. Furthermore, one or more of the thresholds, an amount of hysteresis applied thereto, or the setpoint transfer function may be edited via various embodiments of the GUI described above. For example, to add more thresholds, the user may return to the dialog box 360 in FIG. 3F and click on the "Add" button 362. To change the values of the thresholds, the user may return to the dialog box 360 in FIG. 3F to modify the threshold and/or hysteresis values. Alternatively, a selected communication interface may be employed with threshold values automatically mapped to one or more command registers by the processing device designer engine.

The technique to design processing systems using a GUI as described above provides numerous advantages over many conventional approaches. For example, the technique described above may eliminate the need for users to write processing device code or embedded firmware for processing devices. Furthermore, the above technique provides a clearer presentation of the transfer function, input values, output states, thresholds, hysteresis, etc. Such clearer presentation makes it easier for users to define and/or modify the transfer function, input values, output states, thresholds, hysteresis, etc. Moreover, the technique described above raises design verification to the system-level, which is more flexible and efficient, unlike some conventional approach that uses firmware or machine-code-level verification. The above technique also provides consistent processing device code with deterministic results, and hence, the processing device code become independent of the skills of and/or approaches used by individual firmware engineers. As a result, maintenance and modification of the processing device code may be simplified.

Figure 4:
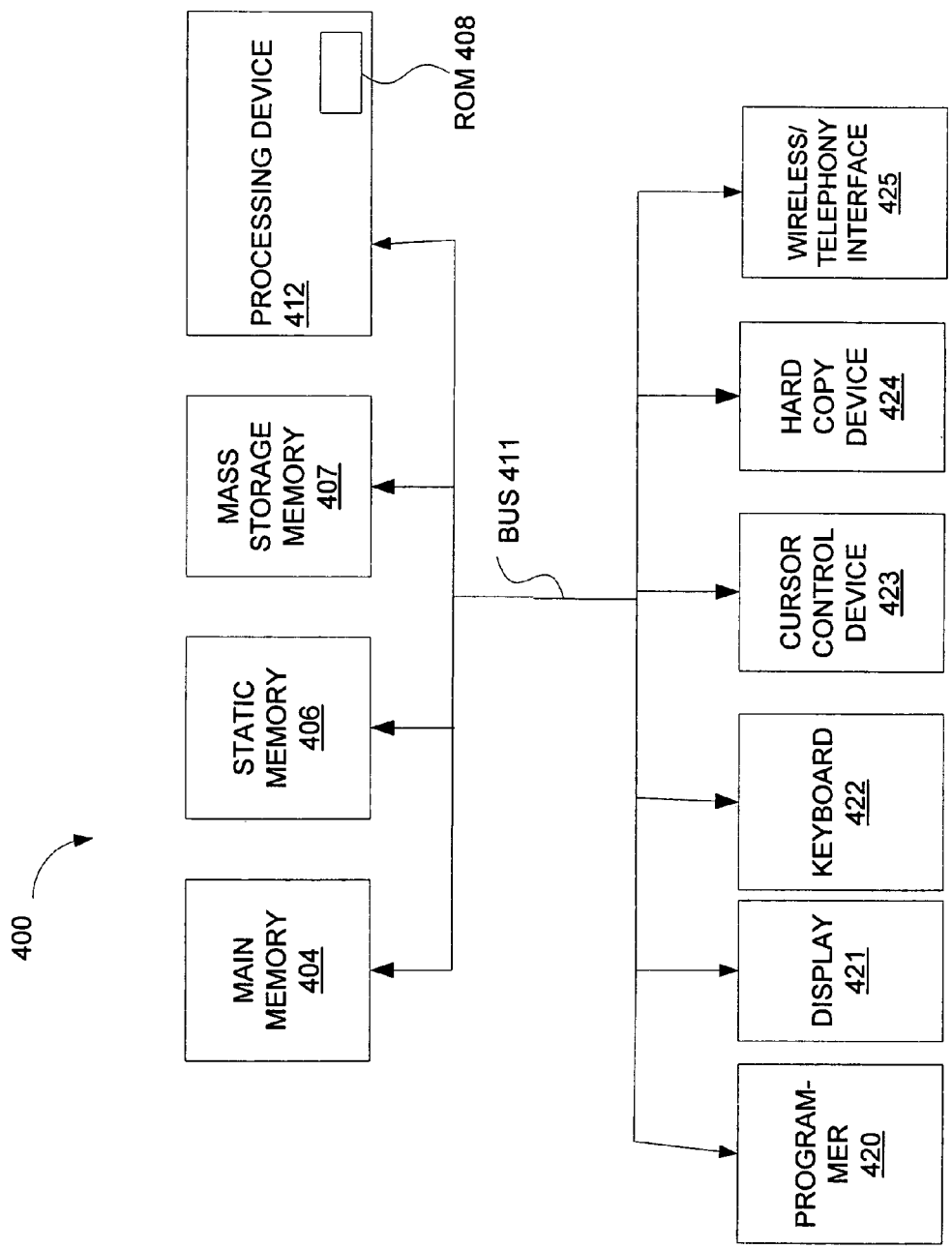
FIG. 4 shows an exemplary computing system usable with some embodiments of the invention.

FIG. 4 shows an exemplary system usable with some embodiments of the present invention. Referring to FIG. 4, computer system 400 comprises a communication mechanism or bus 411 for communicating information, and a processing device 412 coupled with bus 411 for processing information. Processing device 412 includes a microprocessor, but is not limited to a microprocessor.

System 400 further comprises a random access memory (RAM), or other dynamic storage device 404 (referred to as main memory) coupled to bus 411 for storing information and instructions to be executed by processing device 412. Main memory 404 also may be used for storing temporary variables or other intermediate information during execution of instructions by processing device 412.

Computer system 400 also comprises a read only memory (ROM) 408 and/or other static storage device 406 coupled to bus 411 for storing static information and instructions for processing device 412, and a data storage device 407, such as a magnetic disk or optical disk and its corresponding disk drive. Mass storage device 407 is coupled to bus 411 for storing information and instructions.

Computer system 400 may further be coupled to a display device 421, such as a cathode ray tube (CRT) or liquid crystal display (LCD), coupled to bus 411 for displaying information to a computer user. An alphanumeric input device 422, including alphanumeric and other keys, may also be coupled to bus 411 for communicating information and command selections to processing device 412. An additional user input device is cursor control 423, such as a mouse, trackball, track pad, stylus, or cursor direction keys, coupled to bus 411 for communicating direction information and command selections to processing device 412, and for controlling cursor movement on display 421.

Another device that may be coupled to bus 411 is hard copy device 424, which may be used for printing instructions, data, or other information on a medium such as paper, film, or similar types of media. Furthermore, a sound recording and playback device, such as a speaker and/or microphone may optionally be coupled to bus 411 for audio interfacing with computer system 400. Another device that may be coupled to bus 411 is a wired/wireless communication capability 425 to communication to a phone or handheld palm device.

In one embodiment, a user is allowed to define a transfer function via a GUI presented using display device 421. The user may select a transfer function type and provide values of inputs, outputs, thresholds, hysteresis, etc. using keyboard 422 and cursor control device 423. The processing device 412 may generate processing device code based on the defined transfer function. The processing device code, when executed by a second processing device, is configured to cause the second processing device to perform the transfer function defined by the user. In some embodiments, the processing device 412 may generate a ROM image based on the processing device code. Computer system 400 may further include a programmer 420 coupled to the bus 411. Programmer 420 may be used to load the ROM image into the second processing device. Alternatively, in-circuit programming may be used to load the ROM image into the targeted processing device.

Note that any or all of the components of system 400 and associated hardware may be used in various embodiments of the present invention. However, it can be appreciated that other configurations of the computer system usable with some embodiments of the present invention may include some or all of the devices.

Some portions of the preceding detailed description have been presented in terms of symbolic representations of operations on data bits within a computer memory. These descriptions and representations are the tools used by those skilled in the data processing arts to most effectively convey the substance of their work to others skilled in the art. The operations are those using physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus (e.g., a link device) to perform the operations described. The structures for a variety of these systems have been discussed in the description above. In addition, the present invention is not described with reference to any particular programming language. It will be appreciated that a variety of programming languages may be used to implement the teachings of the invention as described herein.

For purposes of clarity, many of the details of processing devices and processing systems in general and computer programs for designing, implementing, and programming the same, that are widely known and are not relevant to the present invention have been omitted from the above description.

The foregoing discussion merely describes some exemplary embodiments of the present invention. One skilled in the art will readily recognize from such discussion, the accompanying drawings, and the claims that various modifications can be made without departing from the spirit and scope of the appended claims. The description is thus to be regarded as illustrative instead of limiting.

What is claimed is:

1. A method comprising:
   creating a graphical user interface (GUI) to allow a user to define a transfer function via the GUI, the transfer function performable by a processing device when executing a processing device code therefor, said creating comprising:
   presenting a display of a plurality of selectable transfer function types and a display of a plurality of selectable transfer function inputs, and a display of a plurality of selectable output state definitions for the transfer function;

providing:
a first user interface control in the GUI to allow the user to select a transfer function type from the display of the plurality of transfer function types,
a second user interface control to allow the user to select one or more transfer function inputs from the display of the plurality of transfer function inputs, and
a third user interface control to allow the user to select one or more transfer function output states; and
making selections of a transfer function type, one or more inputs, and one or more output states: and
submitting the selections to a processing device maker associated with a processing device to cause the processing device maker to generate the processing device code for the processing device based only on the selections without intervention by the user, wherein the processing device code when executed by the processing device is configured to cause the processing device to perform the transfer function.

2. The method of claim 1, wherein said creating the GUI further comprises:
displaying a plurality of permutations of the one or more transfer function' inputs selected and the output states defined;
providing a fourth user interface control to allow the user to select one or more of the plurality of permutations to define input-output dependency of the transfer function.

3. The method of claim 1, further comprising:
inputting the processing device code to a processing device design engine to generate a read-only memory (ROM) image.

4. The method of claim 3, further comprising:
loading the ROM image into the processing device to enable the processing device to perform the transfer function.

5. The method of claim 1, further comprising:
allowing the user to modify the transfer function via the GUI; and in response to modification of the transfer function by the user, automatically regenerating the processing device code using processing device maker.

6. The method of claim 1, comprising:
validating the transfer function; and
simulating the transfer function without running the processing device.

7. The method of claim 1, wherein the transfer function comprises a truth table transfer function.

8. The method of claim 1, wherein the transfer function comprises a setpoint transfer function.

9. An apparatus, comprising:
means for allowing a user to program a processing device to cause the processing device to perform a transfer function without the user writing processing device code, wherein the means comprises:
means for allowing a user to define the transfer function via a graphical user interface (GUI), said means for allowing the user to define the transfer function comprising:
means for presenting a display of a plurality of transfer function types and a display of a plurality of transfer function inputs, and a display of transfer function output states;
means for providing first user interface control in the GUI to allow the user to select a transfer function type from the display of the plurality of transfer function types;
means for providing a second user interface control to allow the user to select one or more transfer function inputs from the display of the plurality of transfer function inputs;
means for providing a third user interface control to allow the user to select one or more output states for the transfer function; and
means for submitting the transfer function to a processing device maker associated with a processing device in response to the user selecting the transfer function type, the one or more inputs, and the one or more output states, to cause the processing device maker to generate processing device code, based only on the selection of the one or more transfer function types, inputs and output states without intervention by the user, wherein the processing device code when executed by the processing device is configured to cause the processing device to perform the transfer function; and
means for allowing the user to modify the transfer function without the user editing the processing device code.

10. The apparatus of claim 9, wherein the means for allowing the user to program the processing device comprises:
means for displaying a plurality of permutations of the one or more transfer function inputs selected and the output states defined;
means for providing a fourth user interface control to allow the user to additionaly select one or more of the plurality of permutations to define input-output dependency of the transfer function.

11. The apparatus of claim 10, wherein the means for allowing the user to program the processing device further comprises:
means for automatically generating the processing device code based on the transfer function.

12. An apparatus, comprising:
a graphical user interface (GUI) to allow a user to define a transfer function via the GUI, said GUI comprising:
a display of a plurality of transfer function types:
a display of a plurality of transfer function inputs;
a display of a plurality of transfer function output states;
a first user interface control to allow the user to select one or more transfer function types from the display of the plurality of transfer function types,
a second user interface control to allow the user to select one or more transfer function inputs from the display of the plurality of transfer function inputs; and
a third user interface control to allow the user to select one or more transfer function output states; and
a processing device maker logically coupled to the GUI to generate processing device code, based only on the one or more transfer function types, inputs and output states selected on the respective first, second and third GUIs, without intervention by the user, wherein the processing device code causes the a processing device to perform the transfer function when executed by the processing device.

13. The apparatus of claim 12, further comprising:
a processing device design engine logically coupled to the processing device maker to generate a read-only memory (ROM) image based on the processing device code, the ROM image to be loaded into the processing device.

14. The apparatus of claim 12, wherein the GUI further comprises:
a user interface control to allow the user to modify the transfer function, wherein the processing device maker automatically regenerates the processing device code in response to modification of the transfer function by the user.

15. A tangible machine readable medium comprising instructions that, if executed by a machine, performs operations comprising:

creating a graphical user interface (GUI) to allow a user to define a transfer function via the GUI, said creating comprising:

presenting a display of a plurality of transfer function types and a display of a plurality of transfer function inputs, and providing a first, user interface control in the GUI to allow the user to select a transfer function type from the display of the plurality of transfer function types, a second user interface control to allow the user to select one or more transfer function inputs from the display of the plurality of transfer function inputs, and a third user interface control to allow the user to select one or more output states for the transfer function; and submitting the transfer function selection, the inputs and output states to a processing device maker associated with a processing device to cause the processing device maker to generate, based only on the selections. the processing device code, which when executed by the processing device, will cause the processing device to perform the transfer function.

16. The machine-readable medium of claim 15, wherein said creating the GUI further comprises:

displaying a plurality of permutations of the one or more transfer function types, inputs selected and the output states defined;

providing a fourth user interface control to allow the user to select one or more of the plurality of permutations; and a predetermined pattern based on the permutations.

17. The machine-readable medium of claim 15, wherein the operations further comprise:

inputting the processing device code to a processing device design engine to generate a read-only memory (ROM) image.

18. The machine-readable medium of claim 17, wherein the operations further comprise:

loading the ROM image into the processing device to enable the processing device to perform the transfer function.

19. The machine-readable medium of claim 15, wherein the operations further comprise:

allowing the user to modify the transfer function via the GUI; and in response to modification of the transfer function by the user, automatically regenerating the processing device code using processing device maker.

20. The machine-readable medium of claim 15, wherein the operations further comprise:

validating the transfer function;

simulating the transfer function using the processing device maker without running the process device.

* * * * *